US010601588B2

(12) United States Patent
Wikman et al.

(10) Patent No.: US 10,601,588 B2
(45) Date of Patent: Mar. 24, 2020

(54) SECURE ACCESS TO REMOTE DATA (71) Applicant: Nokia Technologies Oy, Espoo (FI)

(72) Inventors: Johan Wikman, Helsinki (FI); Oskari Koskimies, Helsinki (FI); Olli Rantapuska, Vantaa (FI); Guido Grassel, Espoo (FI)

(73) Assignee: Nokia Technologies Oy, Espoo (FI)

( * ) Notice: Subject to any disclaimer, the term of this patent is extended or adjusted under 35 U.S.C. 154(b) by 106 days.

(21) Appl. No.: 15/526,302

(22) PCT Filed: Nov. 18, 2014

(86) PCT No.: PCT/FI2014/050880
§ 371 (c)(1),
(2) Date: May 11, 2017

(87) PCT Pub. No.: WO2016/079371
PCT Pub. Date: May 26, 2016

(65) Prior Publication Data
US 2017/0331621 A1    Nov. 16, 2017

(51) Int. Cl.
*H04L 9/08*   (2006.01)
*H04L 9/32*   (2006.01)
(Continued)

(52) U.S. Cl.
CPC .......... *H04L 9/0822* (2013.01); *H04L 9/0819* (2013.01); *H04L 9/0894* (2013.01);
(Continued)

(58) Field of Classification Search
CPC ....... H04L 9/0822; H04L 9/14; H04L 9/0894; H04L 63/061; H04L 63/0428;
(Continued)

(56) References Cited

U.S. PATENT DOCUMENTS 8,296,763 B1    10/2012  Peercy et al.
8,477,941 B1 *   7/2013  Dhanoa ............ H04W 36/0038
                                                380/270

(Continued)

FOREIGN PATENT DOCUMENTS

EP    0695997       2/1996
EP    1501304 A1    1/2005
(Continued)

OTHER PUBLICATIONS

Extended European Search Report received for corresponding European Patent Application No. 14906221.8, dated Jul. 10, 2018, 8 pages.
(Continued)

*Primary Examiner* — Huan V Doan
(74) *Attorney, Agent, or Firm* — Laine IP Oy (57) ABSTRACT

In accordance with an example aspect of the present invention, there is provided an apparatus comprising a receiver configured participate in an association with a first node, and at least one processing core configured to obtain a first credential set based on the association, to determine the apparatus has become associated with a computer, to receive an encrypted first key from the first node, to decrypt the encrypted first key and to provide the decrypted first key to the computer.

20 Claims, 6 Drawing Sheets

(51) Int. Cl.
  *H04L 29/06* (2006.01)
  *H04L 29/08* (2006.01)
  *H04L 9/14* (2006.01)

(52) U.S. Cl.
  CPC .............. *H04L 9/14* (2013.01); *H04L 9/3271* (2013.01); *H04L 63/0428* (2013.01); *H04L 63/061* (2013.01); *H04L 67/1097* (2013.01); *H04L 63/18* (2013.01); *H04L 2209/80* (2013.01); *H04L 2463/062* (2013.01)

(58) Field of Classification Search
  CPC . H04L 67/1097; H04L 9/0819; H04L 9/3271; H04L 2209/80; H04L 63/18; H04L 9/0827; H04L 9/0838; H04L 63/0853; H04L 2463/062
  See application file for complete search history.

(56) References Cited

U.S. PATENT DOCUMENTS

| | | | | |
|---|---|---|---|---|
| 2004/0088510 | A1* | 5/2004 | Hori | G06F 21/10 |
| | | | | 711/165 |
| 2005/0100167 | A1* | 5/2005 | Alve | H04N 7/163 |
| | | | | 380/277 |
| 2006/0236117 | A1* | 10/2006 | Lazaridis | G06K 7/01 |
| | | | | 713/185 |
| 2007/0177740 | A1* | 8/2007 | Nakajima | G06F 21/6218 |
| | | | | 380/277 |
| 2007/0288386 | A1* | 12/2007 | Adachi | G06F 21/10 |
| | | | | 705/58 |
| 2010/0042848 | A1 | 2/2010 | Rosener | |
| 2010/0067705 | A1* | 3/2010 | Boccon-Gibod | G06F 21/10 |
| | | | | 380/285 |
| 2010/0086133 | A1* | 4/2010 | Asano | H04L 9/0822 |
| | | | | 380/255 |
| 2010/0174919 | A1* | 7/2010 | Ito | G06F 21/554 |
| | | | | 713/192 |
| 2011/0258333 | A1 | 10/2011 | Pomerantz et al. | |
| 2014/0059352 | A1 | 2/2014 | Haga et al. | |
| 2014/0096199 | A1 | 4/2014 | Dave et al. | |
| 2014/0230041 | A1 | 8/2014 | Ostrowski | |

FOREIGN PATENT DOCUMENTS

| | | |
|---|---|---|
| WO | 2005045554 | 5/2005 |
| WO | 2006013477 | 2/2006 |
| WO | 2014/130920 A1 | 8/2014 |

OTHER PUBLICATIONS

International Search Report and Written Opinion received for corresponding Patent Cooperation Treaty Application No. PCT/FI2014/050880, dated May 6, 2015, 10 pages.

Choinski et al., "HDS HCP Anywhere: Easy, Secure, On-Premises File Sharing", ESG Lab Review, 2013, pp. 1-12.

* cited by examiner

SECURE ACCESS TO REMOTE DATA

RELATED APPLICATION

This application was originally filed as PCT Application No. PCT/FI2014/050880 filed Nov. 18, 2014.

FIELD OF INVENTION

The present invention relates to managing secure access to remotely stored data.

BACKGROUND OF INVENTION

Data, such as corporate information or consumer data, may be stored and accessed in a variety of ways. Data may be archived on digital tapes, microfilm or printed on paper for long-term storage. For more convenient access to stored data, storage may be implemented on a server, such as for example a corporate server, access to which is restricted to computers that are comprised in an internal network of the corporation. Such storage solutions may be known as network drives, for example.

Outside of the corporate world, remote storage may comprise an arrangement where a consumer rents space on a commercial server. Communication with such a server may be password protected, for example, to restrict access to the data to prevent others from accessing the stored data. In some cases communication between the consumer and server may be encrypted, for example based on hypertext transfer protocol secure, HTTPS, and/or a virtual private network, VPN, arrangement.

Sharing data with other users may be likewise accomplished in a variety of ways. For example, data may be stored on movable storage media, which may be shared. An example of this is storing files on a compact disc re-writable, CD-RW, disc, and providing the disc to another party by hand or by post, for example.

Sharing data may also be accomplished by using a sharing service, such as for example Dropbox, Flickr, Instagram or Facebook. Using such services, a user can upload content into the service, and enable its retrieval by others. For example, a user may configure a file folder on his computer to be synchronized with Dropbox, and subsequently content placed in this folder is copied to the Dropbox service, and others may be enabled to access the content by providing a link to a specific location in the Dropbox service.

Storing content in a remote service provides the benefit that the content is thereby secured against loss in case of a fire or other disaster affecting the user's own equipment. On the other hand, unless the user encrypts the content before storing it in the service, the content will be accessible to not only the intended users but also the party hosting the service, and to parties with access to networking equipment connecting the intended users to the service.

SUMMARY OF THE INVENTION

The invention is defined by the features of the independent claims. Some specific embodiments are defined in the dependent claims.

In accordance with a first aspect of the present invention, there is provided an apparatus comprising a receiver configured participate in an association with a first node, and at least one processing core configured to obtain a first credential set based on the association, to determine the apparatus has become associated with a computer, to receive an encrypted first key from the first node, to decrypt the encrypted first key and to provide the decrypted first key to the computer.

Various specific embodiments of the first aspect may comprise at least one feature from the following bulleted list:

- the apparatus is further configured to obtain a second credential set based on an association with a second node
- the at least one processing core is configured to receive a second encrypted key from the second node, to decrypt the second encrypted key and to provide the decrypted second key to the computer
- the apparatus comprises a mobile phone, wherein the encrypted first key is received from the first node via the computer, over a wireless interface from the computer, and the decrypted first key is provided to the computer over the wireless interface
- the first credential set comprises a persistent encryption key and an identifier of the first node, and wherein the at least one processing core is configured to decrypt the encrypted first key with the persistent encryption key
- the apparatus is further configured to receive from the first node, associated with the encrypted first key, via the computer, a first encrypted data item, and to provide the first encrypted data item to the computer
- the apparatus further comprises a secure element configured to store, at least in part, the first credential set
- the apparatus further comprises a memory, the at least one processing core being further configured to use the memory as a cache for data received from the first node
- the apparatus is configured to cause a program to be activated in the computer.

In accordance with a second aspect of the present invention, there is provided an apparatus comprising a receiver configured to participate in a first association with a first node and a second association with a second node, and at least one processing core configured to obtain a first credential set based on the first association and a second credential set based on the second association, to determine the apparatus has become associated with a computer, to receive an encrypted first data item from the first node, to decrypt the encrypted first data item, to provide the decrypted first data item to the computer, to receive an encrypted second data item from the second node, to decrypt the encrypted second data item, and to provide the decrypted second data item to the computer. The apparatus may be configured to simultaneously store the first credential set and the second credential set.

In accordance with a third aspect of the present invention, there is provided an apparatus, comprising at least one processing core configured to determine whether a master module is associated with the apparatus, to participate in generating a credential set and to cause a transmitter comprised in the apparatus to provide, at least in part, the credential set to a node, wherein the at least one processing core is configured to prevent the provision of a further credential set responsive to a determination the master module is not associated with the apparatus, and a memory configured to store, at least in part, the credential set. The apparatus may be further configured to authenticate a connection request from the node using the credential set, and to provide, in encrypted form, at least one data item toward the node in case the authentication succeeds.

In accordance with a fourth aspect of the present invention, there is provided a method comprising participating in an association with a first node, obtaining a first credential set based on the association, determining an apparatus has become associated with a computer, receiving an encrypted first key from the first node, decrypting the encrypted first key, and providing the decrypted first key to the computer.

Various specific embodiments of the fourth aspect may comprise at least one feature corresponding to a feature from the preceding bulleted list laid out in connection with the first aspect.

In accordance with a fifth aspect of the present invention, there is provided a method, comprising participating in a first association with a first node and a second association with a second node, obtaining a first credential set based on the first association and a second credential set based on the second association, determining an apparatus performing the method has become associated with a computer, receiving an encrypted first data item from the first node, decrypting the encrypted first data item and providing the decrypted first data item to the computer, and receiving an encrypted second data item from the second node, decrypting the encrypted second data item and to providing the decrypted second data item to the computer In accordance with a sixth aspect of the present invention, there is provided a method, comprising determining whether a master module is associated with the apparatus, participating in generating a credential set and causing providing, at least in part, the credential set to a node, and preventing provision of a further credential set responsive to a determination the master module is not associated with the apparatus.

In accordance with a seventh aspect of the present invention, there is provided an apparatus comprising means for participating in an association with a first node, means for obtaining a first credential set based on the association, means for determining an apparatus has become associated with a computer, means for receiving an encrypted first key from the first node, means for decrypting the encrypted first key, and means for providing the decrypted first key to the computer In accordance with an eighth aspect of the present invention, there is provided a non-transitory computer readable medium having stored thereon a set of computer readable instructions that, when executed by at least one processor, cause an apparatus to at least participate in an association with a first node, obtain a first credential set based on the association, determine an apparatus has become associated with a computer, receive an encrypted first key from the first node, decrypt the encrypted first key, and provide the decrypted first key to the computer

INDUSTRIAL APPLICABILITY

At least some embodiments of the present invention find industrial application in providing secure access to remotely stored data.

DETAILED DESCRIPTION OF EXAMPLE EMBODIMENTS

Using a physical device that is provisioned with credentials, access to data stored in a data storage node may be provided in a secured and user-friendly way. In detail, upon pairing the device with the storage node an encryption key may be generated, which can subsequently be used when the same device is paired with a computer. A connection may be formed between the device and the node storing data, based on the encryption key, to provide secured communication of the stored data to the computer. The pairing may take place in physical proximity, for example via a touching interaction. The device may be paired with more than one node storing data, to enable access to data in these nodes.

Figure 1:
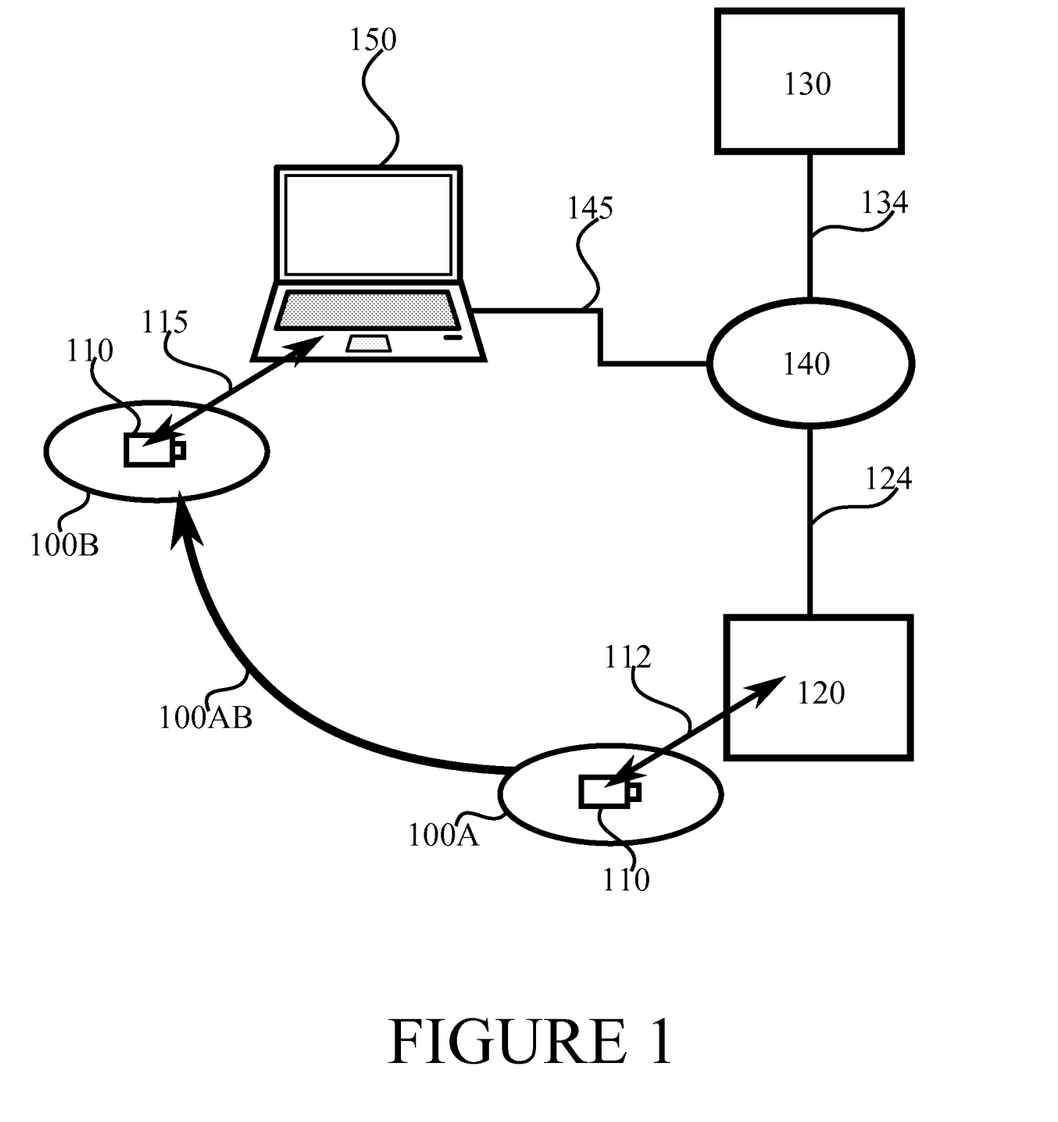
FIG. 1 illustrates an example system capable of supporting at least some embodiments of the present invention.

FIG. 1 illustrates an example system capable of supporting at least some embodiments of the present invention. The system of FIG. 1 comprises a storage node 120, which may comprise, for example, a home server or a corporate server. Storage node 120 may comprise, or have access to, storage media such as magnetic, optical or holographic storage media capable of storing therein information. A user or controller of storage node 120 may use it to store personal information, such as for example digital photographs, or corporate information, such as for example a database, or indeed other information, such as for example measurement data from scientific experiments.

Once data is stored in storage node 120, it may remain there until expressly deleted by the user or controller of storage node 120. In some embodiments, the user or controller may configure storage node 120 to automatically delete data older than a threshold age, to conserve storage capacity of storage node 120. Data may be stored in storage node 120 in a directory tree structure, for example, wherein each directory in the tree may contain data files and further directories.

Storage node 120 is communicatively coupled, via connection 124, with network 140. Network 140 may comprise, at least in part, the internet and/or one or more other networks, such as for example intranets or internet service provider, ISP, networks. Connection 124 may be wire-line or at least in part wireless. Network 140 may be switched based on internet protocol, IP, addressing or based on another addressing scheme.

Computer 150 is communicatively coupled, via connection 145, with network 140. Connection 145 may be wire-line or at least in part wireless. Computer 150 may comprise a desktop, laptop, tablet, phablet or other kind of computer or computing device. Computer 150 need not be physically close to storage node 120, to the contrary they may be in different parts of the same city, or even in different countries, depending on the embodiment and use case. Computer 150 may be furnished with software capable of interacting with data stored on storage node 120, for example computer 150 may have an image viewer program that is enabled to present digital photographs on a screen of computer 150.

Computer 150 and storage node 120 may be addressable in an addressing system of network 140. For example, where network 140 employs IP addressing, computer 150 and storage node 120 may have IP addresses that are valid in network 140. In this case, a packet released into network 140 with a header to-address set as the address of computer 150 would be routed to computer 150. Likewise, a packet released into network 140 with a header to-address set as the address of storage node 120 would be routed to storage node 120. This may be feasible in case network 140 employs IPv6 addressing, for example.

Where computer 150 and/or storage node 120 are not directly addressable using the addressing system of network 140, they may be indirectly addressable using, for example, network address translation, NAT, or network address and port translation, NAPT, techniques. This may be the case, for example, where network 140 employs IPv4 addressing where address space is more constrained than in IPv6, and allocating a public IP address to every node reachable via network 140 is not feasible.

To enable sharing data on storage node 120 with a user of computer 150, device 110 is provided in the system of FIG. 1. Device 110 may comprise a universal serial bus, USB, stick, near-field communication, NFC, tag or other device with suitable communication and storage capability.

Initially device 110 is paired with storage node 120, which may comprise that device 110 is caused to undergo a touch or other interfacing with storage node 120. When paired, device 110 and storage node 120 are joined by association 112. In case device 110 comprises an USB stick, association 112 comprises a USB connection, for example. In case device 110 comprises a NFC tag, association 112 comprises a NFC connection, for example. During the association a credential set is stored in device 110. The credential set may be at least in part generated during the association. A credential set may comprise at least one of: at least one encryption key, a certificate, and a public key of storage node 120. Device 110 may store a public key—private key pair of itself, in which case device 110 may be configured to provide its own public key to storage node 120 during association 112. The at least one encryption key may comprise at least one symmetric encryption key. Device 110 may be configured to employ a symmetric encryption key using, for example, advanced encryption standard, AES, and/or 3DES algorithms, for example. When device 110 is paired with storage node 120, it is disposed in location 100A.

A shared secret may be established between device 110 and storage node 120 by a cryptographic exchange during association 112, such shared secret being comprised in the credential set. In a cryptographic exchange, device 110 and storage node 120 may exchange information that enables them to derive the shared secret, without explicitly communicating the shared secret between them. An example of such a cryptographic exchange is a Diffie-Hellman exchange.

After association 112 is broken, for example by withdrawing device 110 from the proximity of storage node 120, device 110 may be given to a user of computer 150, for example via personal contact. This is illustrated with arrow 100AB, whereby device 110 is transferred to location 100B. When in location 110B, device 110 may become associated with computer 150, for example via a USB or NFC link, depending on the embodiment. The association of device 110 to computer 150 is illustrated as association 115.

Responsive to association 115, computer 150 may be caused to install and/or activate a program. For example, when a USB device is inserted into a USB port of computer 150, computer 150 may be caused by its operating system to install a driver for the USB device. In embodiments of the present invention, this process may be utilized to cause a program co-operating with device 110 to be activated on computer 150. The program may be configured to allow device 110 to, at least in part, use resources of computer 150. Alternatively, a user of computer 150 may install the program, and device 110 may cause, via association 115, the installed program to transition to an activated state.

The user of computer 150 may see, in a directory structure of computer 150, device 110 represented as a directory. By browsing this directory, the user may see represented therein data stored in storage node 120. Alternatively, data stored on storage node 120 may be rendered to the user of computer 150 in another suitable way.

To provide access to the data stored on storage node 120, device 110 may be configured to contact storage node 120 when associated with computer 150. Such contacting may take place via association 115, connection 145, network 140 and connection 124. Such contacting may be based on the credential set stored in device 110 when device 110 was in location 100A. Such contacting may be accomplished, at least in part, using networking capabilities of computer 150. For example, device 110 may store a domain name of storage node 120, which enables device 110 to contact storage 120 after a domain name system, DNS, query to obtain an address usable in contacting storage node 120. Such contacting may be based at least in part on NAT or NAPT information received in device 110 from storage node 120 during association 112.

Once device 110, in location 100B, and storage node 120 are in communication with each other, authentication of device 110 and/or storage node 120 may be performed. Such authenticating may be based at least in part on the credential set stored in device 110, and/or credentials stored in storage node 120. For example, authenticating may comprise that storage node 120 transmits to device 110 a nonce, which device 110 returns to storage node 120 signed with a private key of device 110. Storage node 120 may verify the signature using a public key of device 110 that was provided to storage node 120 during association 112. Optionally, device 110 may transmit a nonce to storage node 120, and verify a signature received in response, using a public key of storage node 120 that was provided to device 110 during association 112. A further example of an authentication method is based on certificates, wherein a secured handshake may be undertaken between device 110 and storage node 120, for example in accordance with HTTPS.

Once device 110 is authenticated, storage node 120 may transmit to device 110 information concerning data stored in storage node 120, to thereby enable device 110 to provide information concerning the shared data to computer 150 for use in the user interface of computer 150. This information may be transmitted to device 110 from storage node 120 in encrypted format, device 110 being enabled to decrypt it using an encryption key stored in device 110 during association 112, for example.

Responsive to the user of computer 150 requesting a file stored in storage node 120, device 110 or computer 150 may request this file from storage node 120. When the request is routed via device 110, device 110 may cryptographically sign the request, to enable storage node 120 to verify the request is authorized. This provides the advantage that storage node 120 is rendered more resistant to denial of service attacks, since it won't need to act on unauthorized requests. Responsively, storage node 120 may transmit the file, in encrypted form, to computer 150, which may provide the encrypted file to device 110. Device 110 may then use an encryption key exchanged during association 112 to decrypt, directly or indirectly, the file, and to provide the decrypted file back to computer 150. This way, the encryption key is stored only on device 110, for example in a secure element that is resistant to tampering.

In some embodiments, when a file is retrieved from storage node 120, computer 150 does not provide the encrypted file to device 110 but stores it internally in computer 150. In these embodiments, storage node 120 generates a transient key that it uses to encrypt the requested file before transmitting it to computer 150. Storage node 120 then encrypts the transient key with a symmetric or public-key encryption process that device 110, based on an encryption key stored in device 110 during association 112, is able to reverse. The encrypted transient key is provided to computer 150 with the encrypted requested file, and computer 150 provides the encrypted transient key to device 110. Device 110 then decrypts the encrypted transient key using the encryption key stored in device 110 during association 112, and provides the decrypted transient key to computer 150, to enable computer 150 to decrypt the requested file using processing resources of computer 150. This enables using the less limited computing resources of computer 150 to be used to decrypt the requested files, while storing the main encryption key only on device 110, for example in a secure element that is resistant to tampering. This also enables device 110 to be built with fewer computing resources.

In some embodiments, the encrypted requested file is provided via computer 150 to device 110, but provided back from device 110 to computer 150 for decryption with the decrypted transient key, wherein device 110 decrypts the transient key and provides it to computer 150 as described above. An advantage of this arrangement is that device 110 may verify a cryptographic signature of storage node 120 that storage node 120 has applied to the encrypted requested file prior to transmitting it toward computer 150.

In some embodiments, decrypted retrieved files are cached either on computer 150 or device 110, to reduce latency in case they're invoked again by the user of computer 150. In case computer 150 performs the decrypting of the requested files, they may be cached on device 110 by providing them in decrypted form to device 110 via association 115.

In some embodiments, authentication is repeated for each file retrieval from storage node 120. In some embodiments, authentication is repeated for a file retrieval from storage node 120 only in case more than a threshold length of time has elapsed since a most recent previous authentication.

In some embodiments, a PIN code is requested from the user of computer 150 each time device 110 is associated with computer 150 after the first association 115. The correct PIN code may be stored on device 110. The correct PIN code may be defined by the user the in connection with the first association 115.

Device 110 may store more than one credential set, corresponding respectively to more than one storage node. In these cases, the user of computer 150 could see virtual directories in the user interface of computer 150 corresponding to each of the storage nodes. In FIG. 1, storage node 130 is illustrated in addition to storage node 120. This enables sharing of data among a group of persons using a single device 110 per person. Each device 110 could be associated in turn with each storage node, so that eventually each device 110 would store a credential set enabling access to each of the storage nodes. The number of credential sets would thus equal the number of storage nodes, with each credential set being associated with exactly one storage node.

In terms of associating a device 110 with a storage node 120 or 130, an owner of the storage node may possess a master module that is capable of being interfaced with his storage node. Such a storage node would only participate in an association with a device 110 in case the master module is interfaced with the storage node. This enables preventing unauthorized persons from associating their devices 110 with storage nodes, for example in case unauthorized persons are visiting premises where a storage node is located. In other words, without the master module unauthorized persons could not trigger association of their devices with the storage node, to thereby obtain a credential set enabling access to data in the storage node from a remote location. The master module may take the form of a USB stick inserted into a USB socket of the storage node or a key inserted in a lock installed in the storage node, for example.

Figure 2:
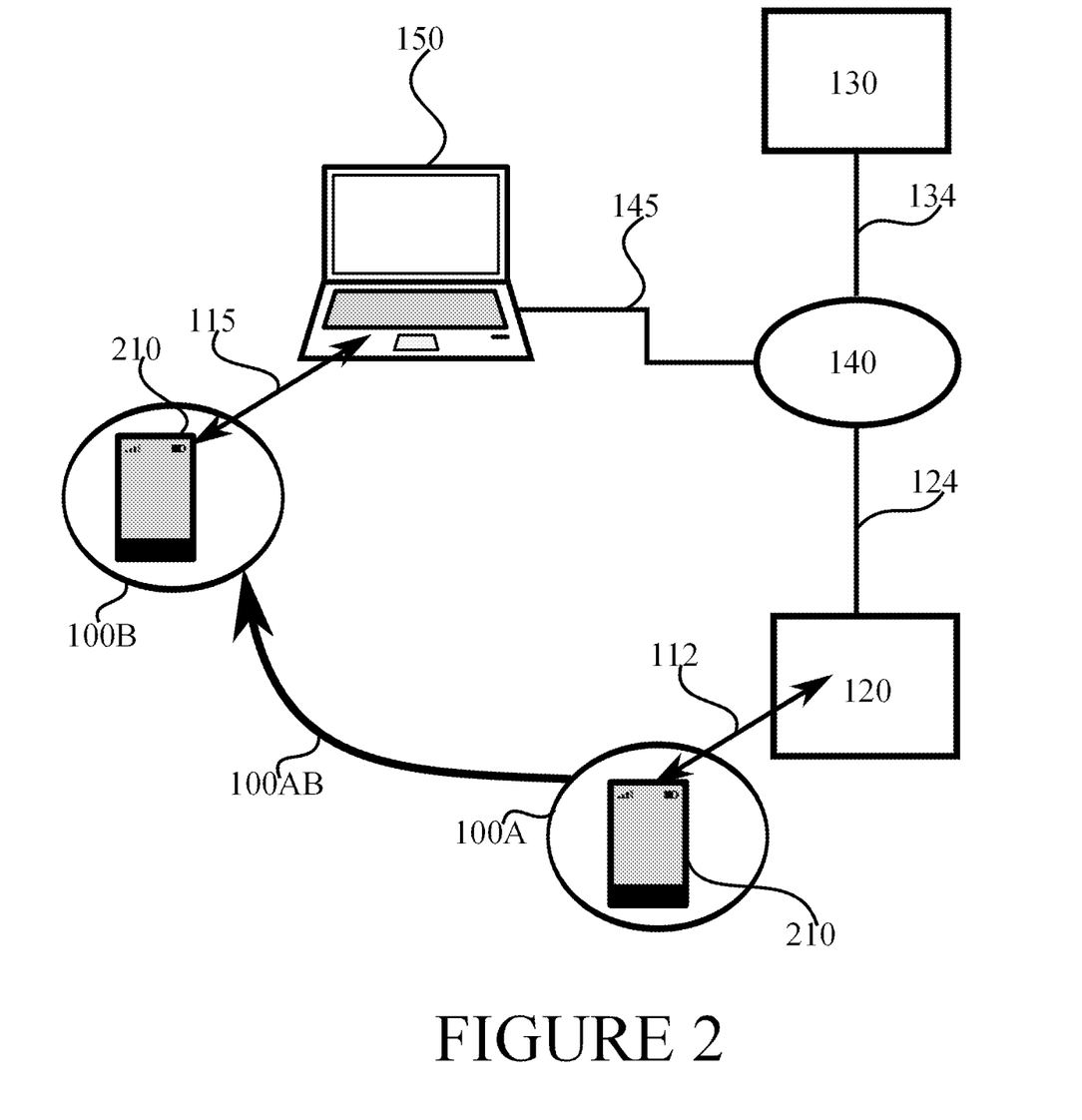
FIG. 2 illustrates an example use case in accordance with at least some embodiments of the present invention.

FIG. 2 illustrates an example use case in accordance with at least some embodiments of the present invention. The system of FIG. 2 resembles that of FIG. 1, and like reference numbers denote like structure as in FIG. 1.

In FIG. 2, device 110 is replaced with smartphone 210. Like device 110, smartphone 210 has communication and storage capability. Smartphone 210 may comprise, for example, Bluetooth, NFC, USB or other communication capabilities. When forming association 112, smartphone 210 may be enabled to scan a visual indication, such as a barcode or 2D barcode, for example, associated with storage node 120. Association 112 may then proceed even via the internet and/or a cloud service, for example, with smartphone 210 providing information derived from the visual indication to authenticate itself as being in the vicinity of storage node 120. Additionally or alternatively, an element may be provided on storage node 120, such as for example a button or switch, that may be activated by a user simultaneously with formation of association 112 to enable storage node 120 to conclude smartphone 210 really is near storage node 120. In the system of FIG. 2, smartphone 210 may perform the role device 110 performs in the system of FIG. 1. When associating with computer 150, smartphone 210 may at least initially be interfaced with computer 150 by USB to trigger program activation, the driver being configured, like in the embodiment of FIG. 1, to enable computer 150 to function as described in the present document. Subsequent to the program activation, smartphone 210 may interface with computer 150 via USB, Bluetooth, NFC or another suitable protocol. Smartphone 210 may comprise a secure element suitable for storing at least in part the credential set for storage node 120, or indeed each storage node smartphone 210 is associated with. Such a secure element may be used in smartphone 210 to store subscriber information and may comprise a universal integrated circuit card UICC, optionally containing a subscriber identity module SIM, application, or a derivative thereof, for example.

Figure 3:
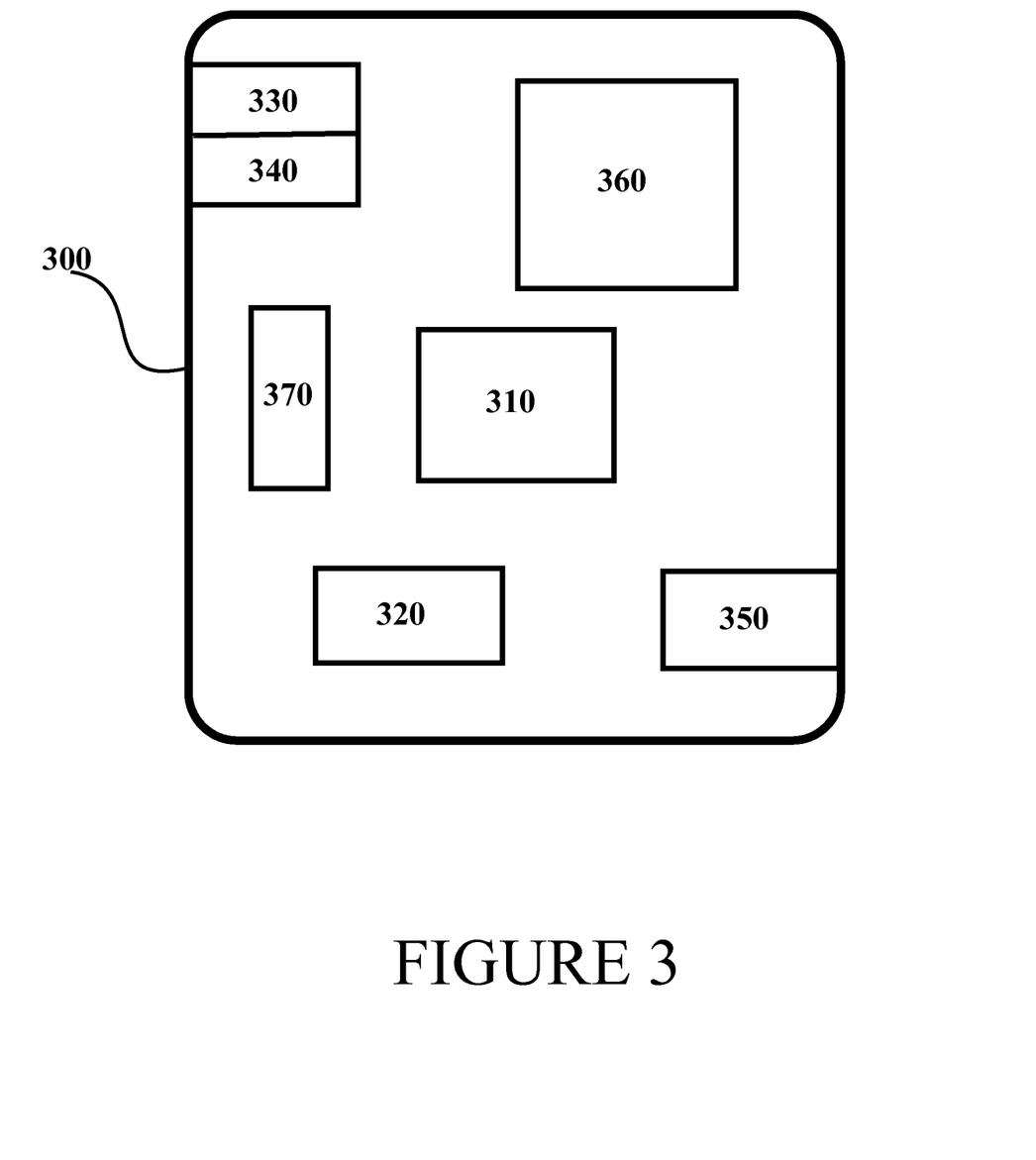
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, a device such as device 110 of FIG. 1 or smartphone 210 of FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by ARM Holdings or a Brisbane processing core produced by Advanced Micro Devices Corporation. Processor 310 may comprise at least one Qualcomm Snapdragon and/or Intel Atom processor. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with USB, global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to play games.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
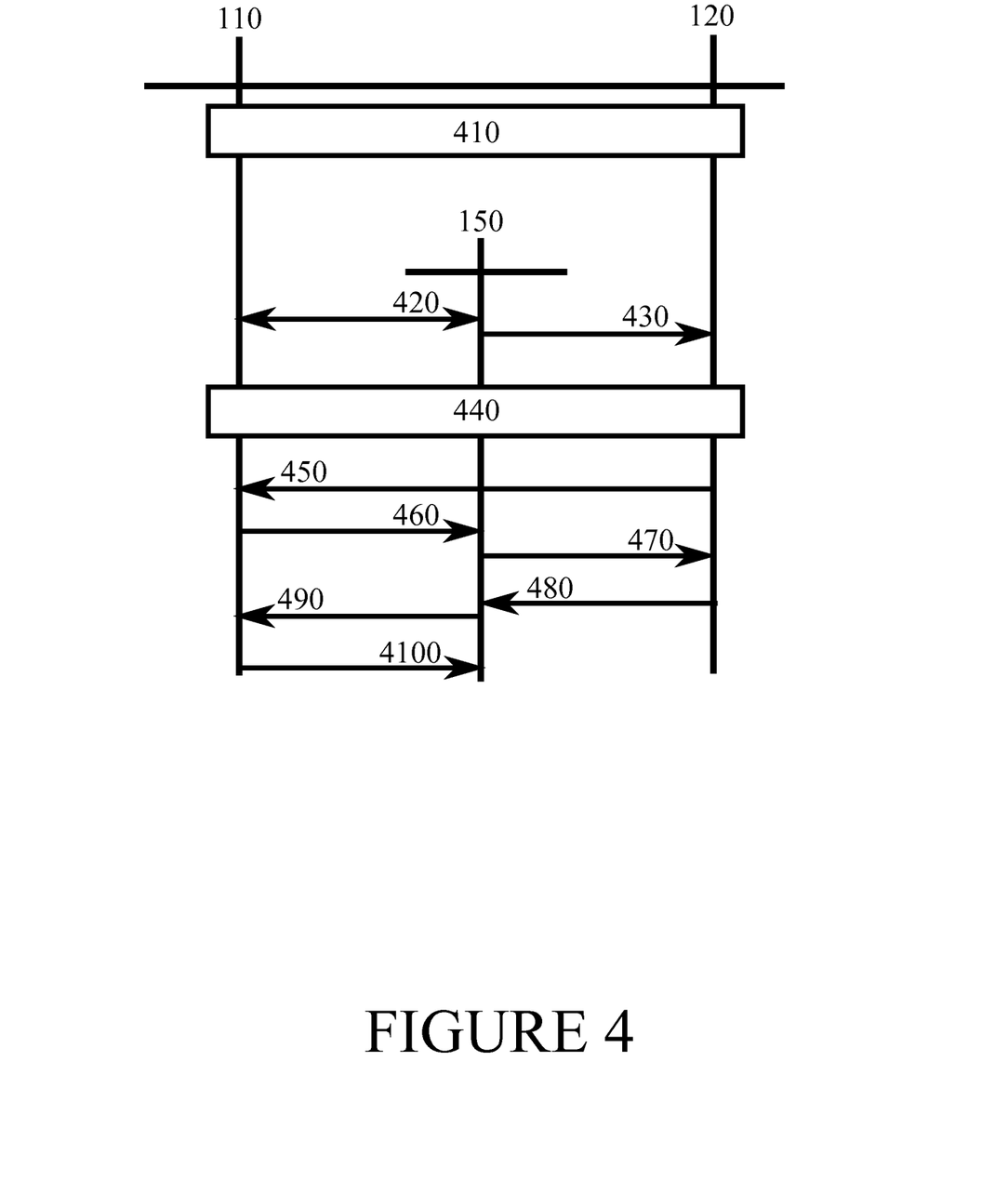
FIG. 4 illustrates signalling in accordance with at least some embodiments of the present invention.

FIG. 4 illustrates signalling in accordance with at least some embodiments of the present invention. On the vertical axes are disposed, from left to right, device 110 and storage node 120. Arranged in between these is a third vertical axis corresponding to computer 150. This third vertical axis begins after phase 410 as will be described hereinbelow. Time advances from the top toward the bottom.

Phase 410 corresponds to association 112 described above in connection with FIG. 1. During phase 410, device 110 is disposed in location 100A. During phase 410, device 110 is provisioned with at least one credential set as described above concerning association 112. After phase 410, device 110 moves to location 100B. In location 100B, computer 150 is disposed along the communication path between device 110 and storage node 120, as illustrated in FIG. 1 and FIG. 2. This is also schematically illustrated in FIG. 4 by the introduction of vertical axis 150 in between vertical axes 110 and 120.

In phase 420, device 110 is associated with computer 150, this association corresponding to association 115 described above. Computer 150 is then caused to communicate with storage node 120, this is illustrated in FIG. 4 as phase 430. Responsive to phase 430, storage node 120 authenticates device 110, phase 440. Messages comprised in the authentication process may traverse computer 150 as they are exchanged between device 110 and storage node 120. The authentication may comprise, for example, at least one nonce and/or a certificate-based authentication as described above. Responsive to a successful authentication, storage node 120 may provide, in phase 450, information concerning data it has available for share to device 110. This message may be encrypted in a way that device 110 is enabled to decrypt based at least in part on the credential set from phase 410.

In phase 460, device 110 may provide to computer 150 information on sharable data in storage node 120. A user interface of computer 150 may present this information as if it were a directory structure available in a directory tree of computer 150, for example, or in another suitable way. For example, it may be presented as if a separate mass memory storing the sharable data were associated with computer 150 in the form of device 110.

In phase 470, computer 150 requests from storage node 120 a file that is comprised in the sharable data. In some embodiments, phase 470 involves device 110 in that computer 150 provides the request to device 110, device 110 then cryptographically signs the request and transmits it to storage node 120 via computer 150. In response, storage node 120 provides the file to computer 150 in phase 480, together with a transient encryption key that storage node 120 has used to encrypt the file. The transient encryption key is in turn encrypted in a way that device 110 can decrypt based on the credential set from phase 410. Computer 150 provides the encrypted transient key to device 110 in phase 490, and device 110 responsively provides the decrypted transient key back to computer 150 in phase 4100. After phase 4100, computer 150 is in possession of the file and the transient encryption key needed to access the contents of the file.

Figure 5:
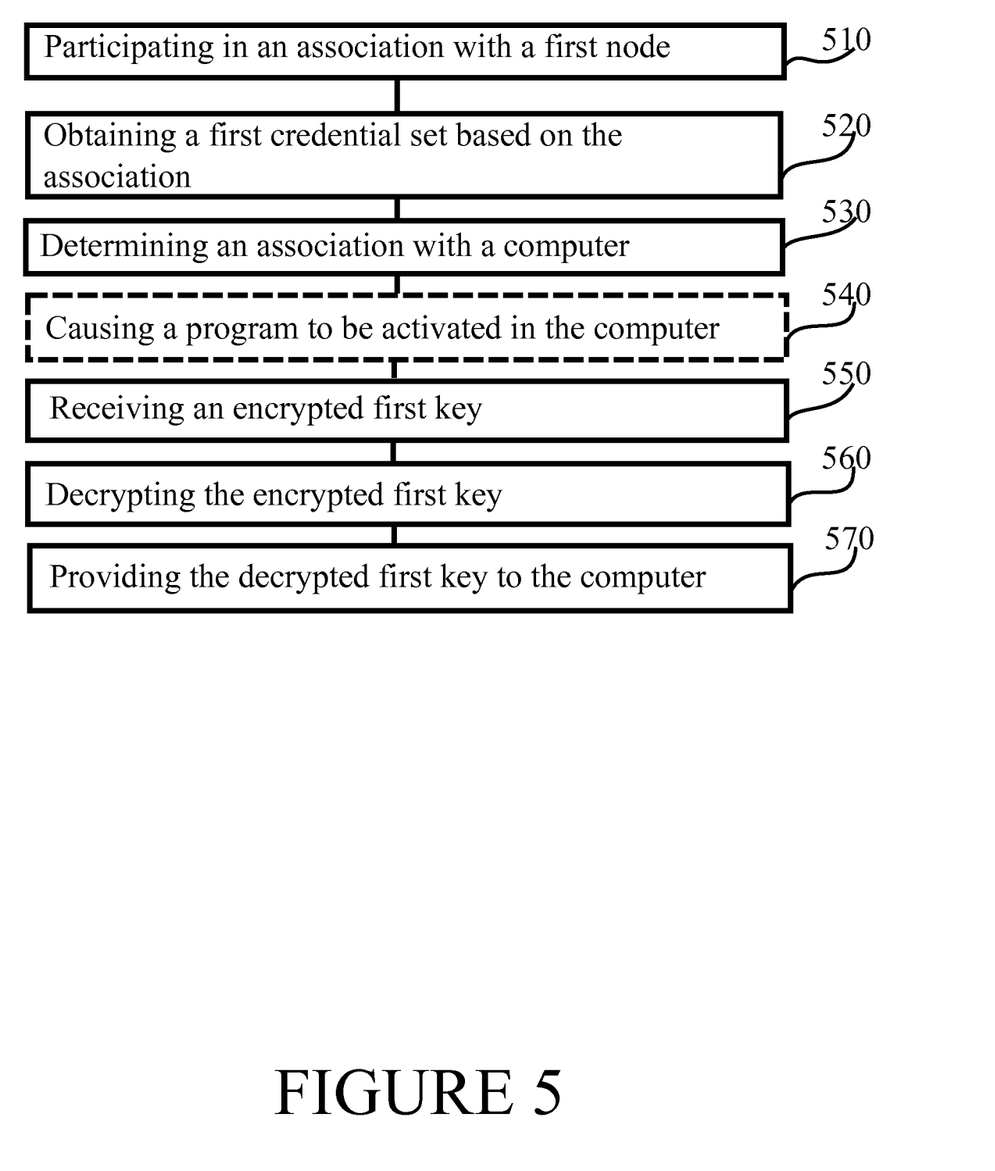
FIG. 5 is a first flow chart of a first method in accordance with at least some embodiments of the present invention.

FIG. 5 is a first flow chart of a first method in accordance with at least some embodiments of the present invention. The phases of the illustrated method may take place in device 110, for example, or in a control device configured to control the functioning of device 110 when implanted therein.

Phase 510 comprises participating in an association with a first node. The association may comprise a short-range association such as, for example, a Bluetooth, USB or NFC association as described above. The association may be direct in the sense that messages exchanged in the association do not traverse any intermediate nodes between the apparatus performing the method and the first node. The first node may comprise a storage node, for example. Phase 520 comprises obtaining a first credential set based on the association. This may comprise, for example, deriving a shared secret based on a cryptographic exchange with the first node, or receiving the shared secret from the first node. Phase 530 comprises determining an association with a computer. The association may be between an apparatus performing the method and the computer, for example. Optional phase 540 comprises causing a program to be activated in the computer. This may comprise causing a program to be installed, for example. Phase 550 comprises receiving an encrypted first key from the first node. Phase 560 comprises decrypting the encrypted first key. The decrypting of phase 560 may be based at least in part on the first credential set. Finally, phase 570 comprises providing the decrypted first key to the computer.

Figure 6:
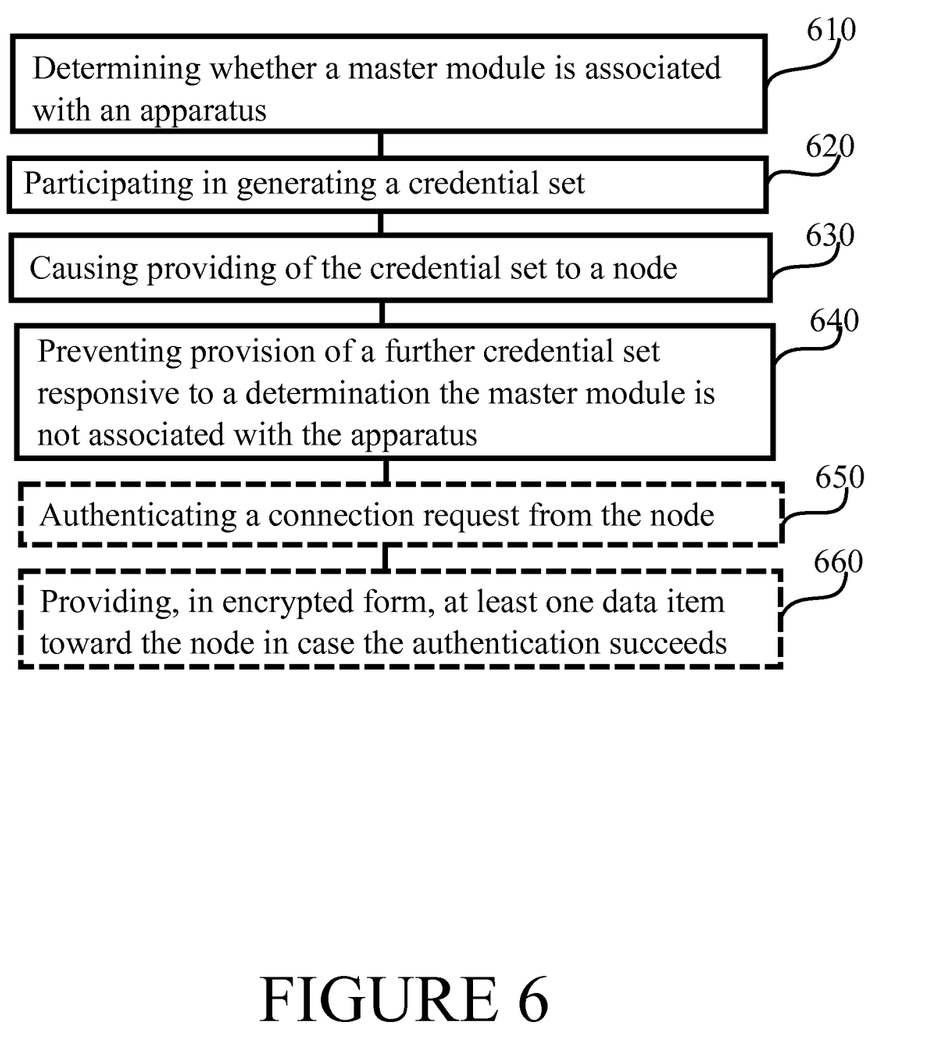
FIG. 6 is a second flow chart of a second method in accordance with at least some embodiments of the present invention.

FIG. 6 is a second flow chart of a second method in accordance with at least some embodiments of the present invention. The phases of the illustrated method may take place in storage node 120, for example, or in a control device configured to control the functioning of storage node 120 when implanted therein.

Phase 610 comprises determining whether a master module is associated with an apparatus, such as for example an apparatus performing the method. Phase 620 comprises participating in generating a credential set. Phase 620 may comprise generating the credential set. Phase 630 comprises causing providing, at least in part, the credential set to a node. Phase 640 comprises preventing the provision of a further credential set responsive to a determination the master module is not associated with the apparatus.

Optional phase 650 comprises authenticating a connection request from the node, for example by using the credential set. Finally, optional phase 660 comprises providing, in encrypted form, at least one data item toward the node in case the authentication succeeds It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
a receiver configured to participate in an association with a first node which is in physical proximity of the apparatus when the association with the first node is established;

at least one processing core configured to obtain a first credential set based on the association, to determine, after the association with the first node has been broken, that the apparatus has become associated with a computer, to receive an encrypted first key from the first node via the computer, to decrypt the encrypted first key, and to provide the decrypted first key to the computer to enable the computer to decrypt an encrypted file received with the encrypted first key from the first node.

2. The apparatus according to claim 1, wherein the apparatus is further configured to obtain a second credential set based on an association with a second node.

3. The apparatus according to claim 2, wherein the at least one processing core is configured to contact the first node, using networking capabilities of the computer, while associated with the computer, to provide the computer access to data stored in the first node.

4. The apparatus according to claim 1, wherein the apparatus comprises a mobile phone, wherein the encrypted first key is received from the first node via the computer, over a wireless interface from the computer, and the decrypted first key is provided to the computer over the wireless interface.

5. The apparatus according to claim 1, wherein the first credential set comprises a persistent encryption key and an identifier of the first node, and wherein the at least one processing core is configured to decrypt the encrypted first key with the persistent encryption key.

6. The apparatus according to claim 1, wherein the apparatus is further configured to receive from the first node, associated with the encrypted first key, via the computer, a first encrypted data item, and to provide the first encrypted data item to the computer.

7. The apparatus according to claim 1, further comprising a secure element configured to store, at least in part, the first credential set.

8. The apparatus according to claim 1, further comprising a memory, wherein the at least one processing core is further configured to use the memory as a cache for data received from the first node.

9. The apparatus according to claim 1, wherein the apparatus is configured to cause a program to be activated in the computer.

10. A method comprising:
   participating in an association with a first node which is in physical proximity of an apparatus when the association with the first node is established;
   obtaining a first credential set based on the association;
   determining, after the association with the first node has been broken, that the apparatus has become associated with a computer;
   receiving an encrypted first key from the first node via the computer;
   decrypting the encrypted first key, and
   providing the decrypted first key to the computer to enable the computer to decrypt an encrypted file received with the encrypted first key from the first node.

11. The method according to claim 10, wherein the method further comprises obtaining a second credential set based on an association with a second node.

12. The method according to claim 11, further comprising contacting the first node, using networking capabilities of the computer, while associated with the computer, to provide the computer access to data stored in the first node.

13. The method according to claim 10, wherein the method is performed in a mobile phone, wherein the encrypted first key is received from the first node via the computer, over a wireless interface from the computer, and the decrypted first key is provided to the computer over the wireless interface.

14. The method according to claim 10, wherein the first credential set comprises a persistent encryption key and an identifier of the first node, wherein the encrypted first key is decrypted with the persistent encryption key.

15. The method according to claim 10, further comprising receiving from the first node, associated with the encrypted first key, via the computer, a first encrypted data item, and providing the first encrypted data item to the computer.

16. The method according to claim 10, further comprising storing the first credential set at least in part in a secure element.

17. The method according to claim 10, further comprising caching data received from the first node in a memory.

18. The method according to claim 10, further comprising causing a program to be activated in the computer.

19. The method according to claim 10, wherein a user interface of the computer is configured to present information on sharable data on the first node as if it were a directory structure available in a directory tree of the computer.

20. A non-transitory computer readable medium having stored thereon a set of computer readable instructions that, when executed by at least one processor, cause an apparatus to at least:
   participate in an association with a first node which is in physical proximity of the apparatus when the association with the first node is established;
   obtain a first credential set based on the association;
   determine, after the association with the first node has been broken, that the apparatus has become associated with a computer;
   receive an encrypted first key from the first node via the computer;
   decrypt the encrypted first key, and
   provide the decrypted first key to the computer to enable the computer to decrypt an encrypted file received with the encrypted first key from the first node.

\* \* \* \* \*